United States Patent [19]
Fava et al.

[11] 3,823,614
[45] July 16, 1974

[54] ENDLESS BELT ALIGNING SYSTEM

[75] Inventors: Ermenegildo Fava; Ermanno Sibilia, both of Milan, Italy

[73] Assignee: Oce-vander Grinten N.V., Venlo, Netherlands

[22] Filed: Nov. 20, 1972

[21] Appl. No.: 308,056

[30] Foreign Application Priority Data
Nov. 22, 1971 Netherlands...................... 7116046

[52] U.S. Cl. ................................................. 74/241
[51] Int. Cl. ............................................ F16h 7/18
[58] Field of Search............................ 74/241, 240

[56] References Cited
UNITED STATES PATENTS

| | | | |
|---|---|---|---|
| 2,592,581 | 4/1952 | Lorig | 74/241 |
| 2,655,251 | 10/1953 | Bankauf | 74/241 X |
| 2,821,291 | 1/1958 | Schott | 74/241 X |
| 2,832,228 | 4/1958 | Lorig | 74/240 |

*Primary Examiner*—Leonard H. Gerin
*Attorney, Agent, or Firm*—Albert C. Johnston

[57] ABSTRACT

An endless belt trained between a driving roller and a guiding roller, such e.g. as a wide rubber belt having a flight thereof bearing against and serving to transport photoprinting sheets over a perforated wall of a tank holding a gaseous developing medium, is maintained in alignment by mounting the belt guiding roller, through rigid members rigidly connected with its bearing supports, on oppositely inclined guide tracks, such as ball tracks each holding one or two bearing balls, which are rigidly supported by structures at the opposite ends of the guiding roller. The guide tracks support parts of the roller mounting members for sliding movement in limited paths so inclined that their linear projections intersect at a point located away from the axis of the guiding roller on or near to a line connecting the mid-points of the axes of the two rollers. The mounting members present flanges at opposite sides of the belt path, each engageable by an edge of the belt for corrective displacement of the guiding roller if the belt travels too far sidewise. Rigid arms provided as the structures supporting the guide tracks can be swung about the axis of the driving roller for movement of the belt and guiding roller assembly away from working position, and can be adjusted in length to provide the required belt tension.

6 Claims, 2 Drawing Figures

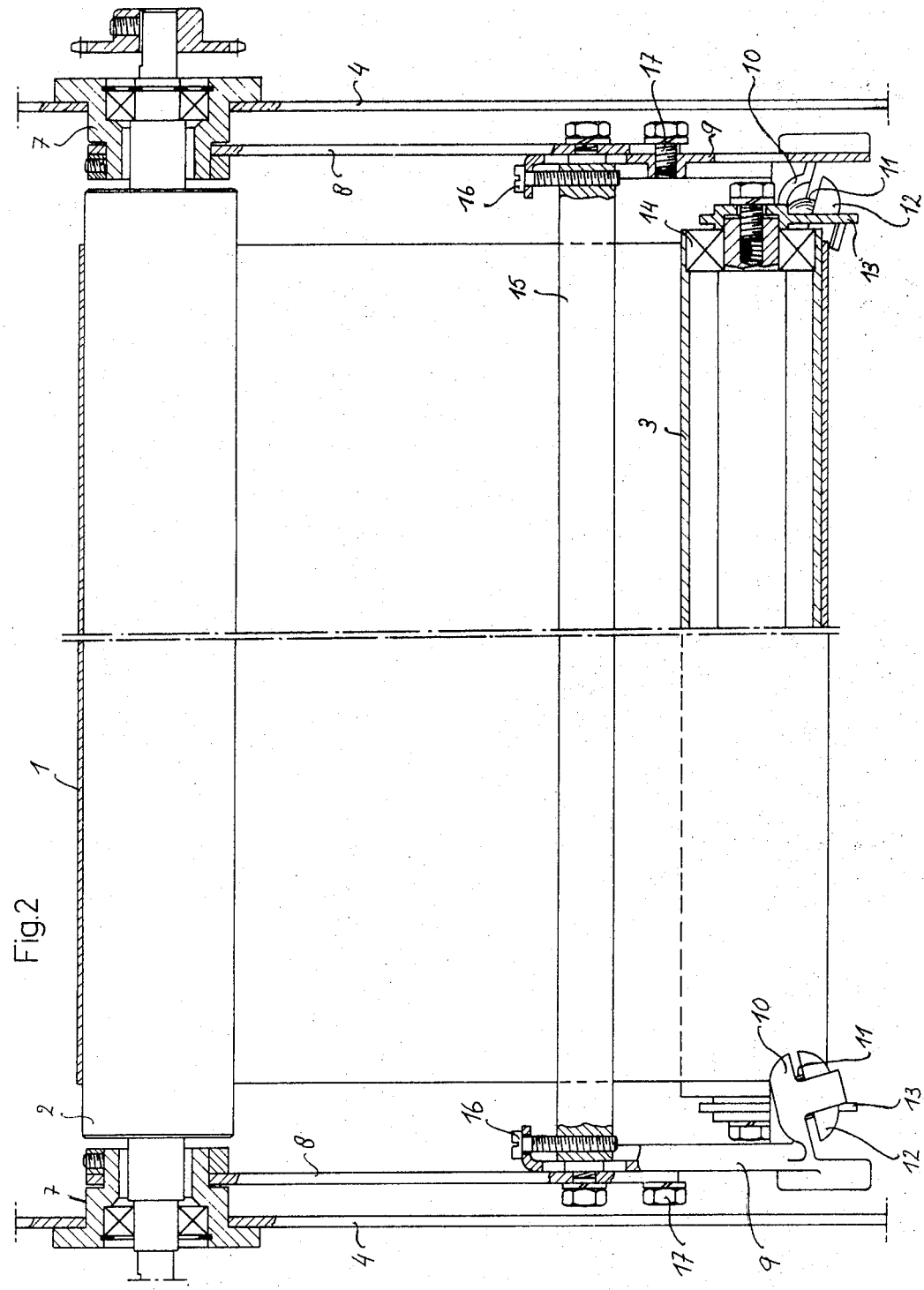

ENDLESS BELT ALIGNING SYSTEM

This invention relates to a system or device for aligning a slightly elastic endless belt trained over a driving roller and a shiftably mounted guiding roller, which system is especially useful for alignment of a wide endless belt so arranged in an apparatus for developing photoprinting sheets with a developer in gaseous or vapor state.

Systems are known for this purpose, such as disclosed in German patent publication No. 1,522,901 and published British patent application No. 635,401, which comprise stops installed on each side of the belt, with one of which the belt makes contact when it moves sideward out of its prescribed path, together with means responsive to the force exerted by the belt on the stop to shift the guiding roller into a position which corrects the path of the belt. In both of these publications limit rollers which can turn separately are provided either on the shaft of the guiding roller or at another appropriate location so that they are engaged by the belt only when it travels sideward out of its prescribed path. Thus the belt can bring one of the limit rollers into rotation in order to shift a guiding roller to an inclined position in which it brings the belt back into the correct path.

Belt aligning systems of those known constructions are quite complicated and susceptible to damage or malfunction. They occupy a considerable amount of space and are not readily accessible for cleaning or repair.

Other systems are known in which the edge of the belt is scanned so that upon sideward displacement of the belt a switch is operated to generate a signal causing a guide roller to be shifted, for instance by means of an electric motor. Such a system is also described in the above-mentioned German patent application. This, however, has the same disadvantages as the constructions mentioned above except that the mechanical wear is less.

The object of the present invention is to provide an improved belt aligning system which makes use of displacements of a belt guiding roller yet is very simple and quite reliable in operation.

According to this invention, in an apparatus wherein a slightly elastic endless belt is trained over and runs between a driving roller and a guiding roller, the bearings of the belt guiding roller and stops which may be engaged upon sideward movement of the belt are connected with each other into a rigid unit which is slidably supported in guide tracks at each side of the belt path and the guide tracks are oppositely inclined in positions such that lines projecting the axes of the sliding movements which they permit intersect near the middle of the length of the guiding roller at a point which lies closer to the driving roller than do the active lengths of the guide tracks.

The guide tracks preferably are ball bearing tracks having one or two balls. Since the guide tracks need have only a short active length, they may be straight yet still will give a good approximation of the most ideal slightly curved form.

The present invention is especially suitable for use in a photo-print developing apparatus in which imagewise exposed copy sheets are developed with a gas or vapor that flows onto them from a tank having a perforated wall over which the sheets are transported by means of an endless belt. When such a developing apparatus is used for very wide copy sheets, it is necessary to have a very wide transport belt, which however is quite short in relation to its width, for conveying the sheets over the developing tank. The stated disadvantages of the above-mentioned known ways of aligning the belt weigh quite heavily in such an apparatus, but they are effectively overcome by use of the present invention.

The guide tracks and, through them, the guiding roller of the belt system of the invention preferably are supported by rigid arms which are pivotally mounted on journals coaxial with the driving roller. This pivotal mounting enables the guiding roller with the belt thereon and the guide tracks to be swung away from a structure engaged by the belt such, for instance, as perforated tank wall of a developing apparatus of the kind described.

The invention will be further understood from the following detailed description and the accompanying drawings of an illustrative embodiment thereof. In the drawings:

FIG. 2 is a composite cross-sectional and plan view of the apparatus of FIG. 1, which on the left-hand side is taken approximately along the line IIa–IIb–IIc of FIG. 1 and on the right-hand side is taken approximately along the line IId–IIc of FIG. 1.

Figure 1:
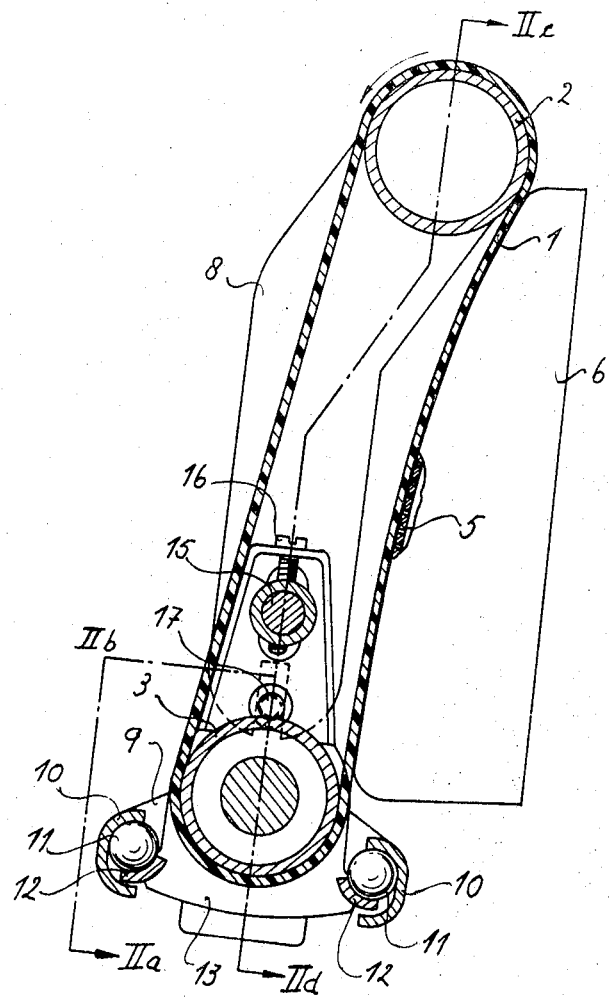
FIG. 1 is a longitudinal cross-sectional view of a photocopy developing apparatus utilizing a wide transport belt and provided with means for correcting the path of the belt according to a preferred embodiment of the invention.

Referring more particularly to the drawings, each of the figures shows an endless rubber belt 1 which is trained over a drive roller 2 and a guide roller 3. Roller 2 is supported in the frame 4 of an apparatus (not shown in detail) for developing photo-printing copy sheets with vapor, for instance with a mixture of ammonia and water, stored in a tank 6. This apparatus normally forms part of a photocopying apparatus.

In known manner a flight of the belt (the right-hand flight or run as seen in FIG. 1) is moved over a fixed, slightly convex perforated wall 5 of the tank 6, thereby transporting the exposed copy sheets over that wall between it and the belt, while the developing vapor escapes through the perforations of wall 5 and acts on the sheets to develop their latent images.

External bearing bushings 7 (FIG. 2) support the ball bearings for roller 2 and in turn are supported by the frame 4. These bushings have external bearing surfaces coaxial with the journals of the drive roller, upon hich surfaces the end portions of arms 8 are pivotally mounted. The arms 8 and parts on them serve for supporting and positioning the belt guiding roller 3. To this end, the arms 8 have extensions 9 with which they are connected through means 15, 16, 17 for adjusting their effective length, and each arm extension 9 rigidly supports two inclined guide tracks 10.

Each guide track 10 supports a bearing ball 11 which is movable on and along the track and is engaged at its opposite side by a cooperating guide track 12 having the same inclination as track 10. As may be seen in FIG. 1 and FIG. 2, an arm 8 with its extension 9 is provided at each side of the belt 1, and the two guide tracks 10 on each arm extension 9 are disposed at opposite sides of the guiding roller 3 near the corresponding end of that roller.

Thus, there are two of the guide tracks 12 near each end of roller 3 at opposite sides thereof. The tracks 12 of each of these pairs of tracks are joined together by a flange 13 which is fixed to and extends transversely from an end of the axle upon which roller 3 is supported. Roller 3 is supported upon and freely rotatable about end portions of this axle through ball bearings 14 in each end of roller 3.

Accordingly, the guide roller 3 is rigidly coupled with the inner members 12 of the inclined guide tracks, while the outer members 10 of these tracks are rigidly coupled with rigid arm assemblies 8, 9 pivotally mounted for movement about the axis of drive roller 2.

The flanges 13 are located at opposite sides of the required path of the belt 1 about the guide roller 3, so that one of these flanges will be engaged by an edge of the belt if the belt should shift too far sideward out of the desired path.

The adjustable means 15, 16, 17 connecting the parts 8 and 9 of each arm assembly hold these parts in firm alignment but enable their effective length to be changed so as to adjust the distance between the rollers 2 and 3 and thus place and hold the belt 1 under the tension required. When the bolts 17 and the bolts at the ends of cross bar 15 are loose, the screws 16 can be turned to modify the effective length of the arm extensions 9 as required, whereupon the bolts can be tightened to keep the arm assemblies at the set length.

It will be observed that the guide tracks of the two sets thereof at each side of the belt 1, which lie on opposite sides of the guide roller 3 at each end thereof, are so disposed that the path of permitted displacement of the inner track member 12 of each set relative to the outer track member 10 thereof, which path is represented by the axis of permitted movement of ball 11 along the active length of the confronting track members, extends in a direction which is inclined toward a point on a center line joining the mid-points of the axes of the rollers 3 and 2. Straight line projections of the respective displacement paths of the two sets of guide tracks at each side of the belt intersect at or near that point to the side of the axis of roller 3 toward roller 2, i.e., away from the side thereof occupied by the guide tracks.

Accordingly, as soon as the belt 1 has travelled sidewise so far that it engages one of the flanges 13, it will exert on this flange a force tending to displace the track members 12 of this flange, relative to the coacting track members 10, in a direction away from the drive roller 2. Any such displacement is accompanied by a corresponding displacement of the end of roller 3 coupled with the engaged flange 13, and also by corresponding displacements of the other flange 13 and the other end of roller 3 in a direction toward the drive roller. These displacements cause the path length and the tension of the belt 1 to increase at the one side thereof and to decrease at the other side, until the tension distribution in the belt and the disposition of roller 3 have created forces which stop further displacement of the belt or even urge it back toward its desired normal path of travel.

The system is thus brought into an equilibrium condition whereby the belt no longer moves sideward and is thus aligned. The moment of reaching this equilibrium condition depends upon a number of factors, among which are the dimensions of the belt and its elastic properties, the friction between the belt and the guide roll and the tension level of the belt.

When the belt is tightly tensioned from the outset, which for instance is the case in regard to sheet transport belts used in photocopy developing apparatus of the kind described hereinabove, the tension normally applied to the belt can itself result in differences of tension over the width of the belt which are sufficient to bring the roller 3 into an inclined position such that sideward displacement of the belt is inhibited. Thus, the desired belt alignment may be established and maintained without sideward travel of the belt so far as to have its edge engage one of the flanges 13. In other words, the roller 3 can undergo belt aligning displacements in response to differences of tension in different transverse regions of the belt, without requiring engagement of one of the flanges 13 by an edge of the belt.

The pivotal mounting of the arms 8 enables the roller 3 with the belt 1 and the arm assemblies supporting them to be swung away from the tank 6 about the axis of roller 2. This is advantageous for various reasons; for instance, it makes it easy to inspect and clean the wall 5 of tank 6, or to remove any copy paper caught between the belt and wall 5.

What is claimed is:

1. In apparatus including a belt driving roller, a belt guiding roller, an endless slightly elastic belt trained about and extending between said rollers under tension and means mounting said guiding roller for displacement thereof to remedy sideward travel of the belt, said guiding roller having a rigid bearing support for each end thereof, the improvement wherein said mounting means comprise a rigid member rigidly connected with each said bearing support, rigid structures respsectively for supporting said members and thus said guiding roller, and inclined guide tracks on each of said structures and upon and along which parts of one of said rigid members are supported and slidable in limited paths, said guide tracks mutually being so oppositely inclined that straight line projections of said paths intersect at or near to a point lying away from the axis of said guiding roller on a line connecting the mid-point of that axis with the mid-point of the axis of said driving roller.

2. Apparatus according to claim 1, each of said rigid members comprising a flange lying adjacent to a side edge of said belt in position to be engaged by said edge upon excessive sideward travel of the belt on said guiding roller.

3. Apparatus according to claim 1, there being at each end of said guiding roller one of said rigid members and two of said guide tracks, said two tracks lying respectively at opposite sides of said guiding roller, said one of said rigid members having thereon two spaced apart parts which respectively are supported upon and slidable along said two tracks.

4. Apparatus according to claim 1, each of said guide tracks being a ball track having one or two bearing balls thereon, the coacting part of the rigid member supported thereon being a ball track member engaging said ball or balls at a side thereof opposite to that engaged by said ball track.

5. Apparatus according to claim 1, said supporting structures comprising rigid arms having said guide tracks fixed thereto and having end portions mounted for pivotal movement about the axis of said driving roller so that said arms and said guiding roller with the belt thereon may be swung away from their normal working position.

6. Apparatus according to claim 1 for developing photo-printing sheets with a gaseous developer, including a tank for said developer having a perforated wall through which the developer is passed onto said sheets while the sheets are moved over said wall, wherein the said endless belt in normal working position has a flight thereof between said rollers bearing against said wall for transporting said sheets over said wall.

* * * * *